(12) United States Patent
Zhou et al.

(10) Patent No.: US 11,002,443 B2
(45) Date of Patent: May 11, 2021

(54) LIGHTING SYSTEM WITH DEFORMABLE HEAT BRIDGE

(71) Applicant: HONEYWELL INTERNATIONAL INC., Morris Plains, NJ (US)

(72) Inventors: Jianhua Zhou, Shanghai (CN); Rui Tong, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 29 days.

(21) Appl. No.: 16/197,892

(22) Filed: Nov. 21, 2018

(65) Prior Publication Data
US 2020/0158321 A1 May 21, 2020

(51) Int. Cl.
| *F21V 29/71* | (2015.01) |
| *F21V 29/89* | (2015.01) |
| *F21V 29/503* | (2015.01) |
| *B64D 47/02* | (2006.01) |
| *F21Y 115/10* | (2016.01) |

(52) U.S. Cl.
CPC .......... *F21V 29/713* (2015.01); *F21V 29/503* (2015.01); *F21V 29/89* (2015.01); *B64D 47/02* (2013.01); *F21Y 2115/10* (2016.08)

(58) Field of Classification Search
CPC ........ F21V 29/70; F21V 29/74; F21V 23/009; F21V 29/713; F21V 15/01; F21V 29/71; F21V 29/50

USPC ......................................................... 362/373
See application file for complete search history.

(56) References Cited

U.S. PATENT DOCUMENTS

| 7,309,146 B2 * | 12/2007 | Hayashi ............... G02B 6/0036 362/294 |
| 9,046,253 B2 | 6/2015 | Petroski |
| 2009/0190352 A1 * | 7/2009 | Van Tertholen .......... F21K 9/00 362/249.02 |
| 2015/0369460 A1 * | 12/2015 | Den Boer ............... F21V 29/70 362/218 |
| 2015/0369466 A1 * | 12/2015 | Rambusch .............. F21V 29/89 362/249.02 |
| 2016/0047538 A1 * | 2/2016 | Peck ....................... F21S 2/005 362/249.02 |

FOREIGN PATENT DOCUMENTS

| CN | 202165885 U | 3/2012 |
| CN | 108332073 A | 7/2018 |
| KR | 20160134024 A | 11/2016 |
| WO | 2014154820 A1 | 10/2014 |

* cited by examiner

*Primary Examiner* — William J Carter
(74) *Attorney, Agent, or Firm* — Lorenz & Kopf, LLP

(57) ABSTRACT

A lighting system includes a lamp that is configured to illuminate. The lamp is coupled to a fixture. A heat bridge is made of a metallic material and is configured to contact the lamp and the fixture, conduct heat from the lamp to the fixture, and deform in response to at least one governing condition.

20 Claims, 4 Drawing Sheets

LIGHTING SYSTEM WITH DEFORMABLE HEAT BRIDGE

TECHNICAL FIELD

Embodiments of the subject matter described herein relate generally to preventing overheating of heat generating lighting systems such as those that include a lamp mounted in an enclosure. More particularly, embodiments of the subject matter relate to lighting systems with a deformable heat bridge to efficiently remove lamp heat, providing improved cooling.

BACKGROUND

Typically, lights such as those used in manufactured environments have been designed for incandescent or halogen bulbs that are contained within a fixture. Conventional incandescent lamps work well in high temperature environments. The incandescent lamp's filament heats and glows to give off light. Heat is beneficial to producing the desired light and therefore is desirable. Halogen lamps are similar to incandescent lamps in-that they include a filament, and typically glow hotter and brighter. Accordingly, transferring heat away from the lamp to protect the lamp for cooling purposes is generally not a primary objective of fixtures designed to use these types of lamps.

Other types of lamps that are more sensitive to temperature such a light-emitting diode (LED) lamps are increasingly being used for their light quality, long-life and efficiency. Unlike incandescent and halogen lamps, the LED lamp does not use a heated filament. A typical self-contained LED lamp generally includes a number of LED chips, which emit the desired light, and internal driver electronic circuitry which are together contained in a housing. The housing typically includes an optic lens through which the light is directed. The driver circuitry regulates current flow through the LED chip.

Because they do not use a heated filament but instead include electronic circuits and components, LED lamps prefer lower temperatures. However, LED lamps and their related circuitry and driver components consume energy and as a result, they also generate heat. These LED lamp and related components may be sensitive to heat, which if not adequately managed may decrease their lifespan. In addition, even slight changes in current such as may be caused by temperature excursions, can cause undesirable changes in light output. In addition, as temperature increases an LED becomes less efficient and repeated high temperature excursions may degrade the overall efficiency of the LED. Therefore lamp cooling is desirable.

A lighting fixture designed for other lamp types may not include appropriate heat management capability for LED lamps. This is particularly the case in drop-in replacement applications because a replacement LED lamp will typically include the driver circuitry in close proximity to the LED itself. In some applications, changing a lighting fixture may be necessary to evolve to the use of LED lamps or other heat sensitive lamps. For example, managing the LED heat is challenging in a manufactured environment where packaging space and light fixture designs are not easily changed.

Accordingly, it is desirable to provide simple and more effective heat management solutions for temperature sensitive lamps such as LEDs for use as alternatives in existing light fixture applications. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a lighting system includes a lamp that is coupled to a fixture. A heat bridge is made of a metallic material and is configured to contact the lamp and the fixture, and conduct heat from the lamp to the fixture.

In accordance with another exemplary embodiment, a lighting system includes a lamp that is configured to illuminate. The lamp is coupled to a fixture. A heat bridge is made of a metallic material and is configured to contact the lamp and the fixture, conduct heat from the lamp to the fixture, and deform in response to at least one governing condition.

In accordance with still another exemplary embodiment, a lighting system includes a LED lamp including an LED board. A fixture is configured for a filament bulb lamp. The LED lamp is coupled to the fixture. A heat bridge includes a metallic element. The metallic element is configured to contact the LED lamp and the fixture, and to conduct heat from the LED board to the fixture, where the fixture is configured as a heat sink. The heat bridge is also configured to deform in response to at least one of heat and force.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the applications and uses of the invention. Furthermore, there is no intention to be bound by any theory presented in the preceding background or the following detailed description.

The description contained herein relates to lighting systems and in certain examples is detailed in the context of a manufactured environment, for example, an aircraft. In aircraft, various types of lamps with different electric power ratings such as from 5 W to 600 W are widely used in a variety of fixtures. These lamps may be used as logo lights, cargo door lights, cargo-bay lights, reading lights, taxi lights, landing lights and in other areas where illumination is needed. The features described in the present disclosure enhance lamp thermal management and are not limited to any particular type of lamp, or to any particular application for lamps, but rather apply wherever effective thermal management is needed. Accordingly, the teachings of the present disclosure may be applied in a variety of applications with lighting systems where heat management is needed, including with lamp fixtures in aircraft, when desired.

Exemplary embodiments described herein involve lighting systems including those with a defined packaging space that is not easily changed, although the disclosure is not limited to those applications. The lamp systems described herein include a lamp that benefits from cooling features that effectively move heat away from the lamp. A typical approach for improving passive heat dissipation is to add cooling fins to increase lamp volume or surface area. However, this approach is limited when available space is confined to an existing fixture. Some fixtures that are already installed in manufactured environments are designed for use with a conventional lamp, and as a result, limit the volume of space for any replacement lamps. The current disclosure provides new thermal management techniques that work within the limitations of the available space of a preexisting fixture.

An example lighting system described herein, includes a lamp that is connected to a fixture through which it receives power to illuminate. A heat bridge made of a metallic material is disposed in contact with the lamp and the fixture. The heat bridge improves cooling of the lamp by conducting heat from the lamp to the fixture. The heat bridge also links to the fixture as increased surface area to improve dissipation of heat from the lamp to atmosphere. The heat bridge is deformable, to facilitate mounting the lamp in the fixture and to allow the lamp to expand and contract, while maintaining a heat transfer path between the lamp and the fixture.

Figure 1:
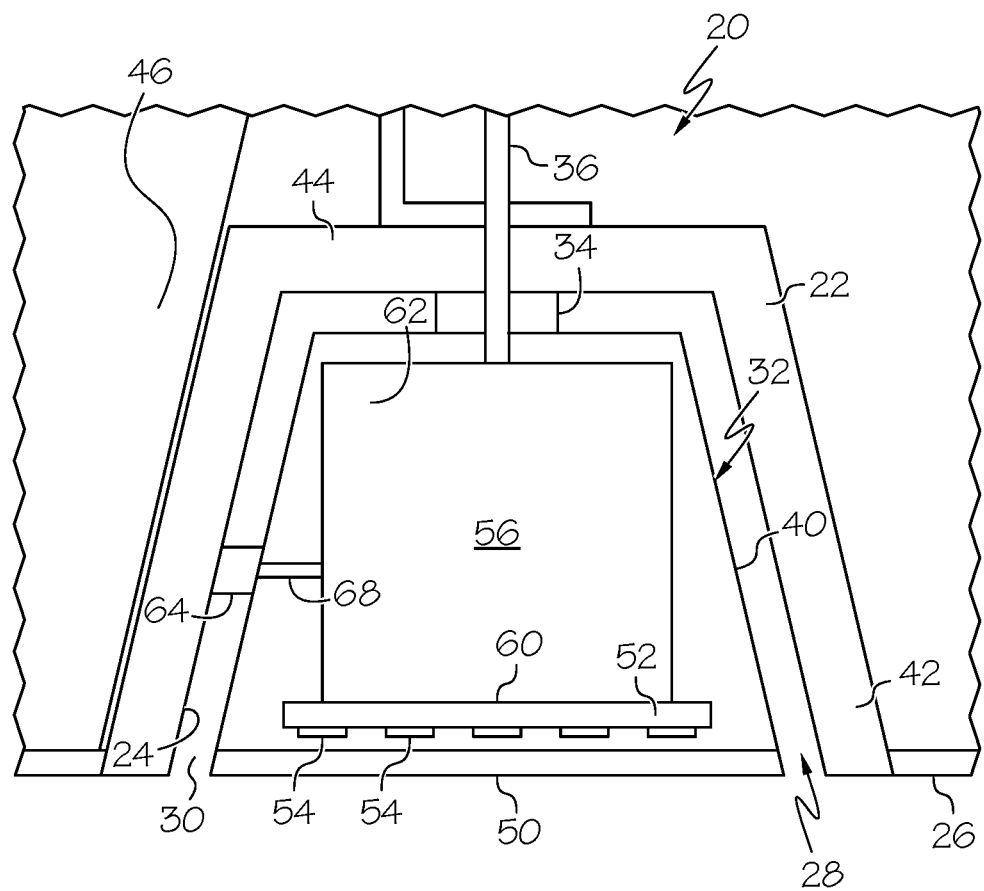
FIG. 1 is a schematic, cross-sectional illustration of a lighting system, according to an exemplary embodiment.

A schematic illustration of a lighting system 20 as shown in FIG. 1, includes a fixture 22 that is installed in an opening 24 of a surface 26, such as an interior or exterior surface of an aircraft. In the current embodiment, the surface 26 is that of an interior surface and the lighting system 20 is provided for illumination needs of interior occupants or crew. In other embodiments, the surface 26 is an exterior surface and the lighting system 20 is provided for exterior illumination purposes. The fixture 22 defines a cavity 28 in the surface 24 with a define space 30. The space 30 may be defined for a certain type of lighting system, and may be limiting as to the volume available to provide heat management solutions for cooling the lamp. The fixture 22 contains a lamp 32, which in the current example is an LED lamp, which may be retrofit into the space 30. The lamp includes a connector 34 for connecting the lamp 32 with a power line 36.

In the current embodiment, the lamp 32 includes a housing 40 for containing its internal components in a self-contained unit for connection with the power line 36 through the connector 34. The connector 34 may for example, be a screw-in connector, a plug-in connector, a clamp connector, or any type of connector to couple the conductors of the lamp 32 with those of the power line 36. The fixture 22 includes a side wall 42 that surrounds the lamp 32 and defines the side of the cavity 28, and an end wall 44 that sets the depth of the cavity 28 from the surface 26. In a number of embodiments, adjacent structure 46 limits the ability to readily insert and mount a fixture larger than that of the fixture 22. The side wall 42 is made of a heat conducting material such as metal and in the current embodiment is made of aluminum. The end wall 44 may also be made of aluminum.

The housing 40 is closed by a lens 50 through which light is directed to the area in front of the surface 26. Within the housing 40, a circuit board 52 extends across the inside area of the lens 50, and carries a LED 54. In this embodiment, the LED 54 is one of a set of LEDs 54 to provide the preferred amount of illumination. A driver circuit board 56 is positioned behind the LED circuit board 52, and the two are electrically coupled and physically connected together. Each of the circuit boards 52, 56 includes a metal layer 60, 62, respectively, and the metal layers 60, 62 are in physical contact with each other. A heat bridge 64 is positioned in the cavity 28 and is configured to contact both the lamp 32 and the fixture 22. The contact may be continuous, or may be intermittent with contact occurring when the lamp is illuminated and generating heat. A heat bridge conductor 68 is disposed inside the housing 40 and is connected with, or in contact with, the metal layer 62, and the heat bridge 64. The layer 60 is coupled with the heat bridge conductor through the layer 62. In other embodiments, the heat bridge conductor 68 is connected directly with the metal layer 60. In additional embodiments, the heat bridge conductor is connected directly with both the metal layers 60, 62. In still other embodiments, the heat bridge conductor is an integral extension of the metal layer 60 and/or of the metal layer 62. The heat bridge 64 and the heat bridge conductor 68 are made of a heat conducting material such as metal. Accordingly, a direct metal-to-metal connection is provided between both metal layers 60, 62 and the fixture 22, through the heat bridge 64 and the heat bridge conductor 68. The result is that the fixture 22 serves as a heat sink for the lamp 32, drawing heat away from the LED 54 and maintaining a cool environment. The size of the fixture 22 provides a large volume of metal to receive heat generated by the lamp 32 and therefore, has a high capacity to receive the conducted heat.

In the current embodiment, the heat bridge 64 is fixed to the lamp 32 and is manufactured as a component thereof. In other embodiments the heat bridge 64 may be a separate component from the lamp 32. The heat bridge 64 is deformable, under one or more governing conditions or situations. In certain embodiments, the heat bridge 64 deforms under the application of force so that the lamp 32 may be readily be connected into the fixture 22, with the heat bridge 64 contacting both the lamp 32 and the fixture 22 when fully connected. In other embodiments, the heat bridge 64 deforms after the lamp 32 is fully connected with the fixture 22, such as during operation of the lamp 32, to complete contact with both the lamp 32 and the fixture 22. In some embodiments, the heat bridge 64 deforms so that the lamp 32 and the fixture 22 may expand at different rates during temperature changes, with the heat bridge 64 remaining in contact with both.

In general, three basic types of heat transfer may act in various differential temperature scenarios. These types include convection, radiation, and conduction. Convection is the transfer of heat by the movement of a fluid, generally from a solid object to the surrounding fluid. In the case of air as the surrounding fluid, convection may occur naturally for example by the heating of the air, which causes a reduction in density and rising of the lighter heated air. Convection may also be forced, such as by using a fan to move the air. Radiation is the transfer of heat through electromagnetic waves emitted from a heated object. Conduction is the transfer of heat between objects that are in physical contact and results from molecular agitation. The heat bridge 64 being made of metal, exhibits a high thermal conductivity coefficient to efficiently transfer heat between the lamp 32 and the structure of fixture 22 via conduction. Transferring heat of lamp 32 to the structure of the fixture 22 maintains a lower temperature of the lamp 32, thereby improving performance and life span. The resulting heat transfer performance is beneficial in applications such as aircraft lighting. In applications for aviation lighting, the density of air is substantially reduced when the craft reaches cruising elevations. Lower air density reduces the heat dissipation capability of conventional convection approaches such as cooling fins. While conventional fins help heat dissipation, in low density air environments the convective heat transfer effect is reduced. The conductive processes of the heat bridge 64 remain effective in these environments, since the lower air density does not degrade conduction.

Figure 2:
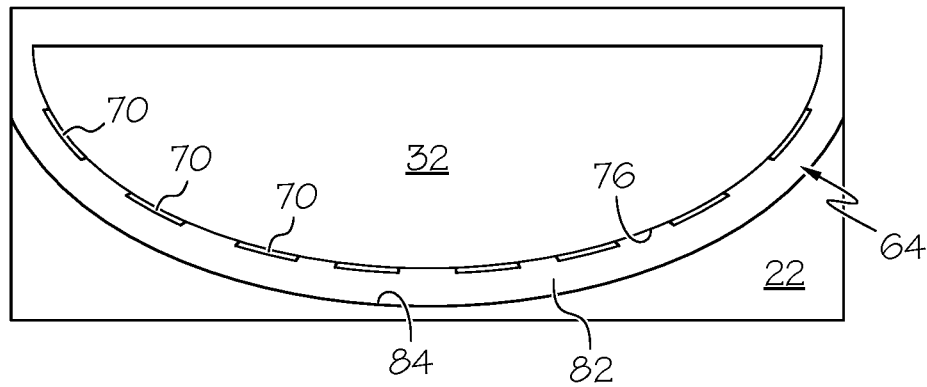
FIG. 2 is a schematic, cross-sectional illustration of a lighting system in an off state, according to an exemplary embodiment.
Figure 3:
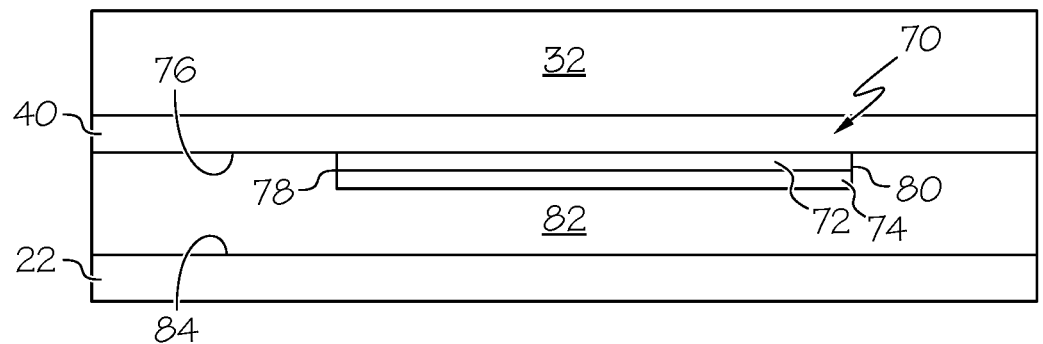
FIG. 3 is a fragmentary illustration of a bimetallic element of the lighting system of FIG. 2 in a non-heated state, according to an exemplary embodiment.

Referring to FIG. 2, illustrated is an embodiment in which the lamp 32 includes a number of bimetallic elements 70 as the heat bridge 64. The bimetallic elements 70 each include at least two strips of different metal materials. For example and referring additionally to FIG. 3, the bimetallic elements 70 include two bonded strips 72, 74 of metals that have different coefficients of thermal expansion, for example steel and copper. As such, the bimetallic elements 70 convert a change in temperature into mechanical displacement of their bodies. In the current embodiment, the strip 72 has a higher coefficient of thermal expansion than the strip 74. As shown in FIGS. 2 and 3, when the lamp 32 is assembled, the bimetallic elements 70 are fixed to the lamp 32 and generally lay against, or in close proximity with, the surface 76 of the housing 40. In this embodiment, the end 78 is fixed to the housing 40, such as by brazing, welding, mechanical fastening, or other means. Other than the end 78, the bimetallic elements 70, including at their opposite ends 80, are free to move away from the housing 40. The housing 40 may be made of a metal such as aluminum, or a heat bridge conductor 68 may be coupled with each of the bimetallic elements 70 through the housing 40 to provide a metal-to-metal contact for conductive heat transfer. Due to the as-assembled orientation of the bimetallic elements 70 against the housing 40, the lamp 32 is easily inserted into the fixture 22 and may be aligned, rotated and moved without interference between the heat bridge 64 and the fixture 22. When the lamp 32 is fully connected with the fixture 22 as shown in FIGS. 2 and 3, a gap 82 exists between the bimetallic elements 70 and the surface 84 of the fixture 22.

Figure 4:
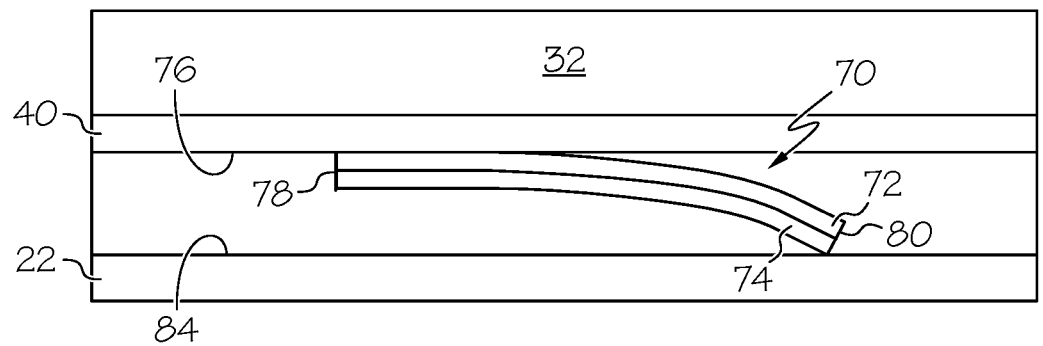
FIG. 4 is a fragmentary illustration of a bimetallic element of the lighting system of FIG. 2 in a heated state, according to exemplary embodiment.
Figure 5:
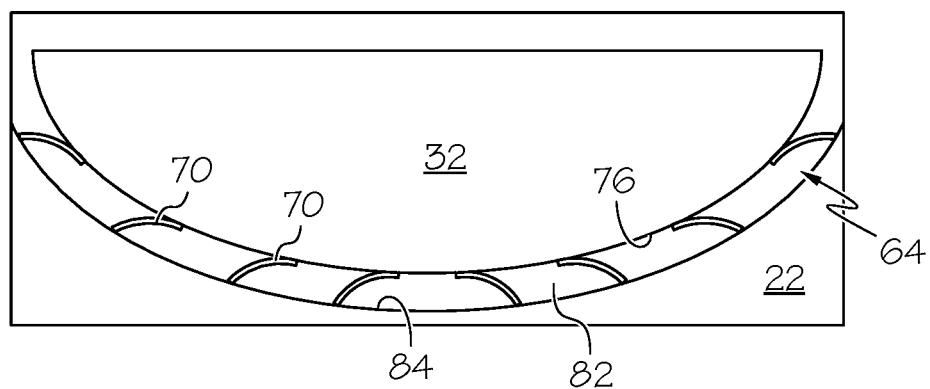
FIG. 5 is a schematic, cross-sectional illustration of the lighting system of FIG. 2 in an on state, according to an exemplary embodiment.

When the lamp 32 is in operation and heat is generated, the housing 40 warms and the bimetallic elements 70 are deformable and expand in response to the governing condition of the temperature increase. As the strips 72, 74 expand at different rates with the strip 72 expanding more for a given temperature increase, the ends 80 move away from the surface 76. With sufficient temperature increase, the ends 80 contact the surface 84 as shown in FIGS. 4 and 5. The bimetallic elements 70 complete the heat bridge 64 spanning the gap 82 so that a metal conduction path is provided from the boards 52, 56 to the fixture 22. The fixture 22 serves as a heat sink with a substantial volume for the conduction of a large amount of heat away from the lamp 32. In certain embodiments, the fixture is continuously cooled due to its connection with a larger metallic structure of the manufactured environment within which it resides. In addition, the fixture 22 provides a larger surface area than the lamp 32 for added convective heat transfer to the surrounding environment.

Figure 6:
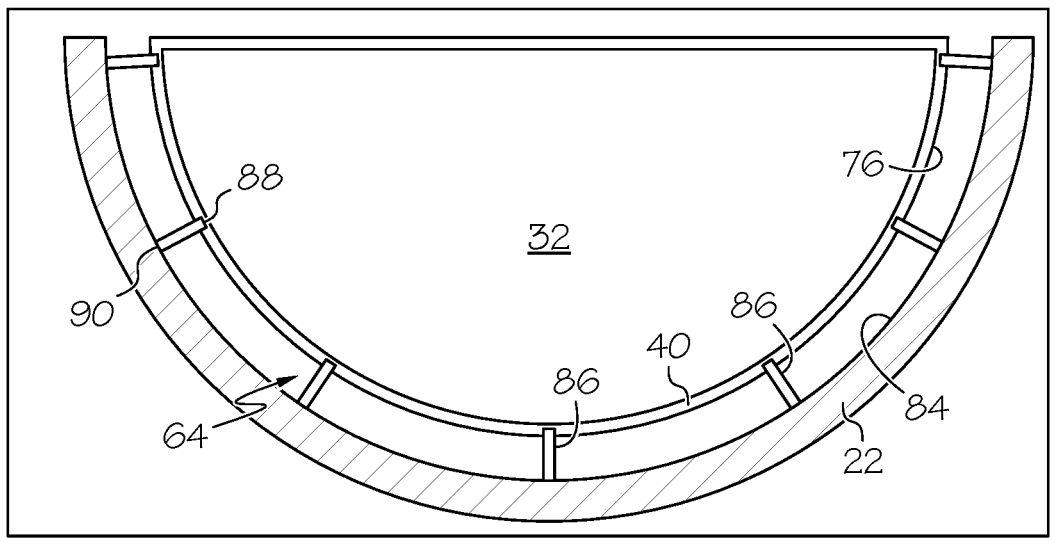
FIG. 6 is a schematic, cross-sectional illustration of a lighting system, according to an exemplary embodiment.

Referring to FIG. 6, illustrated is an embodiment in which the lamp 32 includes a number of metallic elements 86 as the heat bridge 64. In the current embodiment, the metallic elements 86 are made of a material such as a foamed aluminum alloy. In other embodiments a wide range of expanded metals may be used in various alloy forms and/or in combination with composites. In the current embodiment, the foamed material may be tailored to exhibit elasticity to maintain contact between the lamp 32 and the fixture 22 following deflections. In other embodiments, other expanded metal type materials may be used, each with a deformability and/or elasticity tailored to the size of the gap 82 and the contour of the surface 84 of the fixture 22. In certain embodiments, the surface 76 is substantially covered by one metal element 86. Each of the metallic elements 86 includes an end 88 that is fixed to, or otherwise maintained against, the housing 40 of the lamp 32. The metallic elements 86 are carried by the lamp 32 as an assembly. When the lamp 32 is in the process of being connected with the fixture 22, it may be aligned, rotated and moved and any interference between the heat bridge 64 and the fixture 22 is accommodated by deformation of the metallic elements 86. When the lamp 32 is fully connected with the fixture 22 as shown in FIG. 6, the gap 82 is closed through contact of the metallic elements 86 with the surface 84 of the fixture 22. Again, the fixture 22 serves as a heat sink with a substantial volume for the conduction of a large amount of heat away from the lamp 32 through the heat bridge 64.

Figure 7:
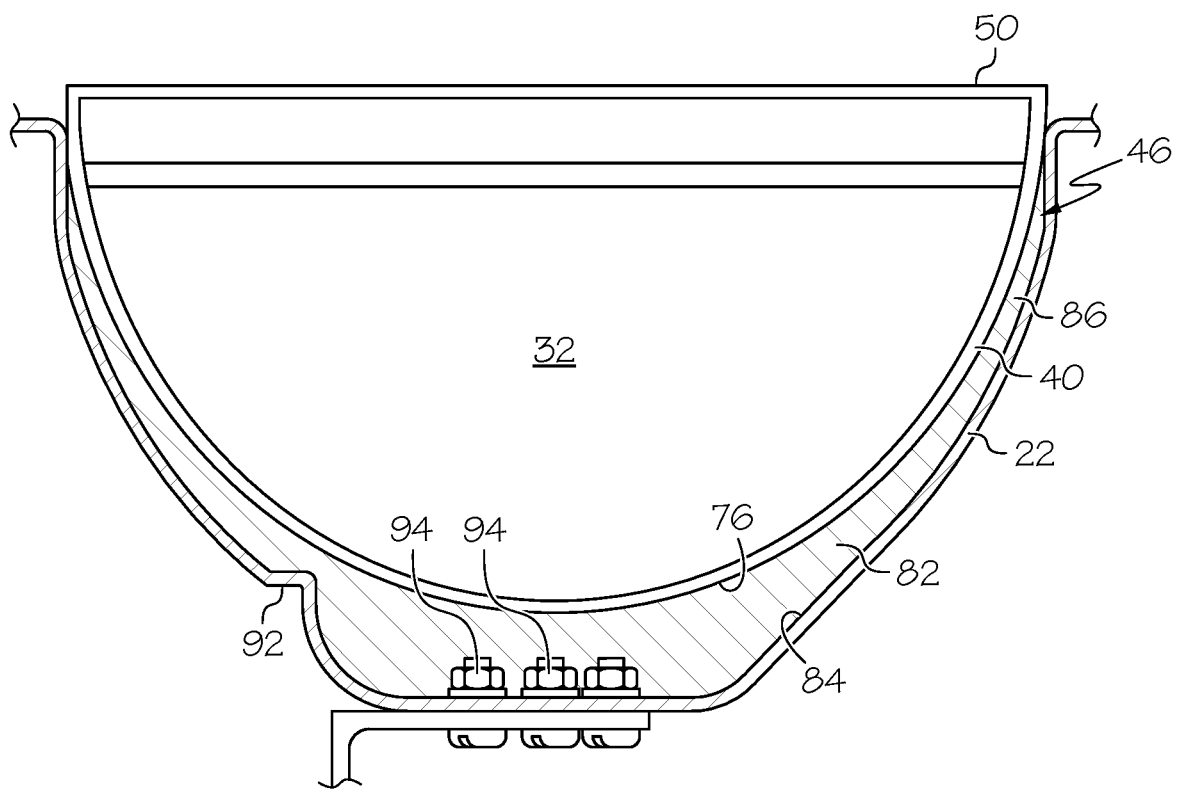
FIG. 7 is a schematic, cross-sectional illustration of a lighting system, according to an exemplary embodiment.

As shown in FIG. 7, the metallic element 86 of the heat bridge 46 may be of a one-piece construction that substantially covers the outside of the lamp 32, except at the lens 50. The metallic element 86, which in this embodiment is made of foamed metal, fills the gap 82 and remains in contact with the surface 76 of the housing 40 and with the surface 84 of the fixture 22. The fixture 22 is mounted to the metallic structure 90 of the manufactured environment within which it resides, which in this embodiment is an aircraft. The foamed metal of the metallic element 86 is deformable so that any inconsistencies of the surface 84 are accommodated by the governing condition of compression of the metallic element 86. For example the indentation 92 and the screws 94, which project from the surface 84 toward the lamp 32 deform the adjacent area of the metallic element 86. In embodiments where the lamp 32 is a screw-in type, the metallic element 86 may be tailored to include resiliency so that after rotation in the fixture 22, areas of the metallic element 86 that were temporarily compressed re-expand to contact the fixture 22.

Accordingly, exemplary embodiments discussed herein provide improved heat transfer capability for cooling a lamp through enhanced conduction properties. The improved cooling leads to longer lamp life and improved lighting performance. The approach is compatible with a wide range of fixtures and is adaptable to retrofitting fixtures with new types of lamps, without redesigning the fixture and without changing the fixture's lamp-facing profile, saving cost and lead-time. The deformable heat bridge provides a high thermal conductivity coefficient between the lamp and the fixture and its mounting structure. Deformability means the bridge deforms to match the gap between the lamp and the fixture. By providing metal-to-metal contact with the fixture, heat dissipation is not limited to the capability of the lamp itself, but is enhanced by the structure of fixture.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A lighting system comprising:
a lamp comprising a light-emitting diode (LED) construction;
a fixture to which the lamp is coupled, the fixture comprising a structure configured and constructed for receiving a bulb of at least one of an incandescent and a halogen construction, the fixture including a connector configured to couple conductors of the lamp with a power line in the fixture; and
a heat bridge carried by the lamp, solely and comprising a metallic material, the heat bridge extending from the lamp and separate from the fixture, the heat bridge configured to:
contact the lamp and the fixture; and
conduct heat from the lamp to the fixture,
wherein the lamp is received in the fixture with the structure of the fixture unchanged, meaning the lamp comprises a LED drop-in replacement for the bulb with no changes to the fixture, with no changes to the structure, and with the bulb discarded,
wherein the fixture serves as a heat sink for the lamp.

2. The system of claim 1, wherein the heat bridge is fixed to the lamp, wherein the heat bridge is not fixed to the fixture, and wherein the heat bridge is configured to deform, in response to at least one governing condition.

3. The system of claim 2, wherein the governing condition is heat generated by the lamp.

4. The system of claim 2, wherein the governing condition is force applied as a result of mounting the lamp in the fixture so that the heat bridge is compressed between the lamp and the fixture, wherein the heat bridge is deformable to facilitate mounting the lamp in the fixture and to allow the lamp to expand and contract when mounted in the fixture while maintaining a heat transfer path between the lamp and the fixture, wherein the heat bridge is deformed as a result of mounting the lamp to the fixture.

5. The system of claim 1, wherein the fixture is configured to dissipate heat from the lamp to atmosphere via a surface area increased in relation to the lamp alone.

6. The system of claim 1, wherein the lamp includes an LED board with a metal layer, and comprising a heat bridge conductor in coupled metal-to-metal contact with the metal layer of the LED board and with the heat bridge defining a heat conduction path from the LED board to the fixture.

7. The system of claim 6, comprising an LED driver board, wherein the LED board is in metal-to-metal contact with the fixture through the LED driver board, the heat bridge conductor, and the heat bridge.

8. The system of claim 1, wherein the lamp includes a housing containing LED components in a self-contained unit for connection with the power line through the connector.

9. The system of claim 1, wherein the lamp includes a housing containing LED components, wherein the heat bridge comprises a number of bimetallic elements fixed to the lamp, distributed across the housing, and normally laying against the housing so the lamp is insertable into the fixture for alignment, rotation and movement without interference between the heat bridge and the fixture.

10. The system of claim 1, wherein the heat bridge comprises a foam metal element carried by the lamp and shaped to mate with a contour of the fixture, the foam metal element substantially filling a gap between the lamp and the fixture.

11. The system of claim 1, wherein the heat bridge is fixed to the lamp and is configured to span the gap when the lamp is received within the fixture, without change to the fixture.

12. The system of claim 1, wherein the lamp comprises:
a housing;
a lens closing the housing;
a LED board extending inside the lens; and
a heat bridge conductor configured to provide a metal-to-metal path from the LED board to the heat bridge, and therethrough to the fixture.

13. A lighting system comprising:
a lamp comprising a light-emitting diode (LED) construction with a housing containing LED components on its inside, the housing having an outside surface;
a fixture to which the lamp is coupled, the fixture having a structure defining a cavity with a defined space configured for a bulb with a heated filament construction; and
a heat bridge carried by the lamp, the heat bridge comprising a metallic material and fixed to the outside surface of the lamp, the heat bridge configured to contact the fixture to conduct heat from the lamp to the fixture,
wherein the lamp is configured as a drop-in replacement for the at least one of the bulb without modification of the fixture including and without modification of the structure and without modification of the defined space, with the outside surface facing the fixture, and
wherein the fixture serves as a heat sink for the lamp.

14. The system of claim 13, wherein the fixture is configured to dissipate heat from the lamp to atmosphere via a surface area increased in relation to the lamp alone.

15. The system of claim 13, wherein the lamp includes a light emitting diode (LED) board and comprising a heat bridge conductor in metal-to-metal contact with the LED board and with the heat bridge.

16. The system of claim 15, comprising an LED driver board, wherein the LED board is in metal-to-metal contact with the fixture through the LED driver board, the heat bridge conductor, and the heat bridge.

17. The system of claim 13, wherein the lamp includes a housing containing LED components, wherein the heat bridge comprises a number of bimetallic elements fixed to the lamp, distributed across the housing, normally laying against the housing, and moveable to contact the fixture and configured to span a gap between the lamp and the fixture in response to heat generated by the lamp.

18. The system of claim 13, wherein the heat bridge comprises a foam metal element carried by the lamp, shaped to mate with a contour of the fixture, and configured to span a gap between the lamp and the fixture, wherein the foam metallic element of the heat bridge comprises a one-piece construction that substantially covers the outside of the housing facing the fixture.

19. The system of claim 13, wherein the lamp comprises:
a housing;
a lens closing the housing;
a light emitting diode (LED) board extending inside the lens; and a heat bridge conductor configured to provide a metal-to-metal path from the LED board to the heat bridge, and therethrough to the fixture.

20. A lighting system comprising:

a light emitting diode (LED) lamp including an LED board;

a fixture having a construction configured to receive at least one of an incandescent bulb and a halogen bulb, the LED lamp coupled to the fixture as a drop-in replacement for the at least one of the incandescent bulb and the halogen bulb without modification of the fixture and without modification of the structure; and a heat bridge fixed to the LED lamp and comprising a metallic element, wherein the metallic element is configured to:

contact the LED lamp and the fixture, without being fixed to the fixture;

conduct heat from the LED board to the fixture, wherein the fixture is configured as a heat sink; and deform in response to at least one of heat and force to contact the fixture, wherein the fixture serves as a heat sink for the LED lamp.

* * * * *